United States Patent
Lee

(10) Patent No.: US 11,281,310 B2
(45) Date of Patent: Mar. 22, 2022

(54) COMPOSITE KEY STRUCTURE AND WIRELESS ELECTRONIC DEVICE USING THE SAME

(71) Applicants: LITE-ON ELECTRONICS (GUANGZHOU) LIMITED, Guangzhou (CN); LITE-ON TECHNOLOGY CORPORATION, Taipei (TW)

(72) Inventor: Chien-I Lee, Taipei (TW)

(73) Assignees: LITE-ON ELECTRONICS (GUANGZHOU) LIMITED; LITE-ON TECHNOLOGY CORPORATION

( * ) Notice: Subject to any disclaimer, the term of this patent is extended or adjusted under 35 U.S.C. 154(b) by 0 days.

(21) Appl. No.: 16/906,585

(22) Filed: Jun. 19, 2020

(65) Prior Publication Data
US 2021/0103347 A1 Apr. 8, 2021

Related U.S. Application Data

(60) Provisional application No. 62/912,074, filed on Oct. 8, 2019.

(30) Foreign Application Priority Data

May 25, 2020 (CN) .......................... 202010447128.8

(51) Int. Cl.
*G06F 3/0354* (2013.01)
*G06F 1/26* (2006.01)
(Continued)

(52) U.S. Cl.
CPC .......... *G06F 3/03543* (2013.01); *G06F 1/263* (2013.01); *G06F 3/038* (2013.01); *G06F 2203/0384* (2013.01)

(58) Field of Classification Search
CPC .... G06F 3/1261; G06F 3/1204; G06F 3/1222; G06F 3/1238; G06F 3/1255;
(Continued)

(56) References Cited

U.S. PATENT DOCUMENTS

| | | | | |
|---|---|---|---|---|
| 6,051,799 A | * | 4/2000 | Fuhrmann | G11B 33/027 200/331 |
| 6,570,111 B2 | * | 5/2003 | Nakagawa | H01H 13/70 200/343 |

(Continued)

FOREIGN PATENT DOCUMENTS

DE 102008024120 B3 * 12/2009 ............ B60J 7/0573

*Primary Examiner* — Bryan Earles
(74) *Attorney, Agent, or Firm* — Innovation Counsel LLP

(57) ABSTRACT

A composite key structure and a wireless electronic device using the same are provided. The composite key structure includes a circuit board, a first switch, a second switch, a first movable member and a second movable member. The circuit board has a first surface and a second surface opposite to the first surface. The first switch is disposed on the first surface. The second switch is disposed on the second surface. The first movable member rotatably disposed on the first switch relative to the circuit board to activate the first switch. The second movable member slidably disposed on the first movable member to activate the second switch.

7 Claims, 8 Drawing Sheets

(51) Int. Cl.
*G06F 3/038* (2013.01)
*H01H 13/14* (2006.01)

(58) Field of Classification Search
CPC ..... G06F 3/1291; G06F 3/1213; H01H 25/00; H01H 25/002; H01H 25/006; H01H 25/008; H01H 25/04; H01H 25/06; H01H 3/46

See application file for complete search history.

(56) References Cited

U.S. PATENT DOCUMENTS

| | | | | |
|---|---|---|---|---|
| 7,916,459 B2* | 3/2011 | Lee | ............... | H01H 15/107 |
| | | | | 361/679.01 |
| 8,222,554 B2* | 7/2012 | Moon | ............... | H01H 25/006 |
| | | | | 200/547 |
| 8,243,425 B2* | 8/2012 | Yang | ............... | H01H 15/16 |
| | | | | 361/679.08 |
| 8,626,252 B2* | 1/2014 | Kim | ............... | H04M 1/236 |
| | | | | 455/575.1 |
| 10,095,323 B1* | 10/2018 | Tseng | ............... | G06F 3/023 |
| 10,727,020 B1* | 7/2020 | Tseng | ............... | H01H 15/24 |
| 2012/0075199 A1* | 3/2012 | Hsieh | ............... | G06F 3/03547 |
| | | | | 345/173 |
| 2019/0329127 A1* | 10/2019 | Chou | ............... | A63F 13/22 |
| 2021/0096665 A1* | 4/2021 | Lee | ............... | G06F 3/02 |

* cited by examiner

COMPOSITE KEY STRUCTURE AND WIRELESS ELECTRONIC DEVICE USING THE SAME

This application claims the benefits of U.S. provisional application Ser. No. 62/912,074, filed Oct. 8, 2019 and People's Republic of China application Serial No. 202010447128.8, filed May 25, 2020, the subject matters of which are incorporated herein by reference.

BACKGROUND OF THE INVENTION

Field of the Invention

The invention relates in general to a key structure, and more particularly to a composite key structure and a wireless electronic device using the same.

Description of the Related Art

Normally the wireless mouse is provided with a power switch and a pairing key. The pairing key is hardly used. This is because the wireless mouse, once set and successfully paired with an electronic device, will be automatically connected next time, and there is no need to perform setting and pairing again. Meanwhile, since the pairing key still occupies a position on the lower cover and more or less affects the appearance or internal space of the wireless mouse, the structure of the pairing key and the wireless mouse still needs to be improved.

SUMMARY OF THE INVENTION

The invention is directed to a composite key structure and a wireless electronic device using the same, in which combine multiple keys as one single key. Thus, the quantity of keys can be decreased.

According to one embodiment of the present invention, a composite key structure is provided. The composite key structure includes a circuit board, a first switch, a second switch, a first movable member and a second movable member. The circuit board has a first surface and a second surface opposite to the first surface. The first switch is disposed on the first surface. The second switch is disposed on the second surface. The first movable member is rotatably disposed on the first switch relative to the circuit board to activate the first switch. The second movable member is slidably disposed on the first movable member to activate the second switch.

According to another embodiment of the present invention, a composite key structure is provided. The composite key structure includes a circuit board, a first switch, a second switch, a first movable member, a second movable member. The circuit board has a first surface and a second surface opposite to the first surface. The first switch is disposed on the first surface. The second switch is disposed on the second surface. The first movable member is movably and rotatably disposed on the first switch relative to the circuit board to activate the first switch. The second movable member is disposed on the first movable member and configured to move and rotate along with the first movable member to activate the second switch.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed structures and operation principles of the invention are disclosed below in a number of embodiments with accompanying drawings. However, the disclosed embodiments are for explanatory and exemplary purposes only, not for limiting the scope of protection of the invention.

According to an embodiment of the invention, a composite key structure used in a wireless electronic device, such as wireless mouse, wireless headphone, wireless microphone, and wireless speaker, is provided. Although the wireless electronic device is exemplified by a wireless mouse in the embodiments below, the invention is not limited to the said exemplification

First Embodiment

Figure 1A:
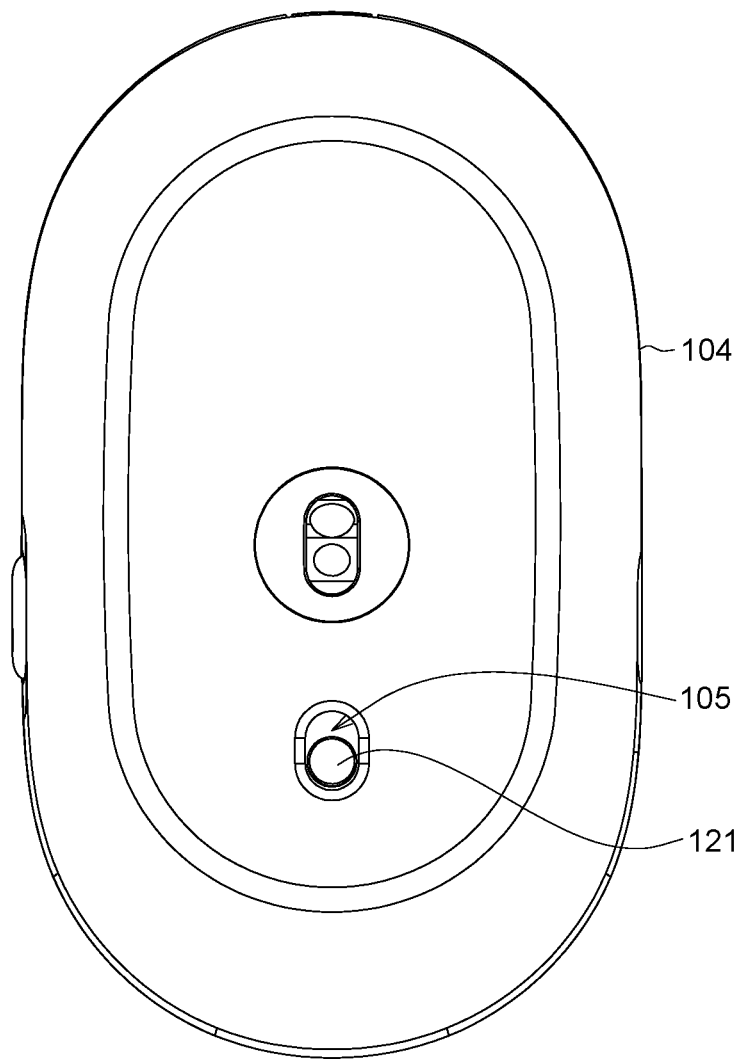
FIG. 1A is a schematic diagram of the bottom of a wireless mouse according to an embodiment of the invention.
Figure 1B:
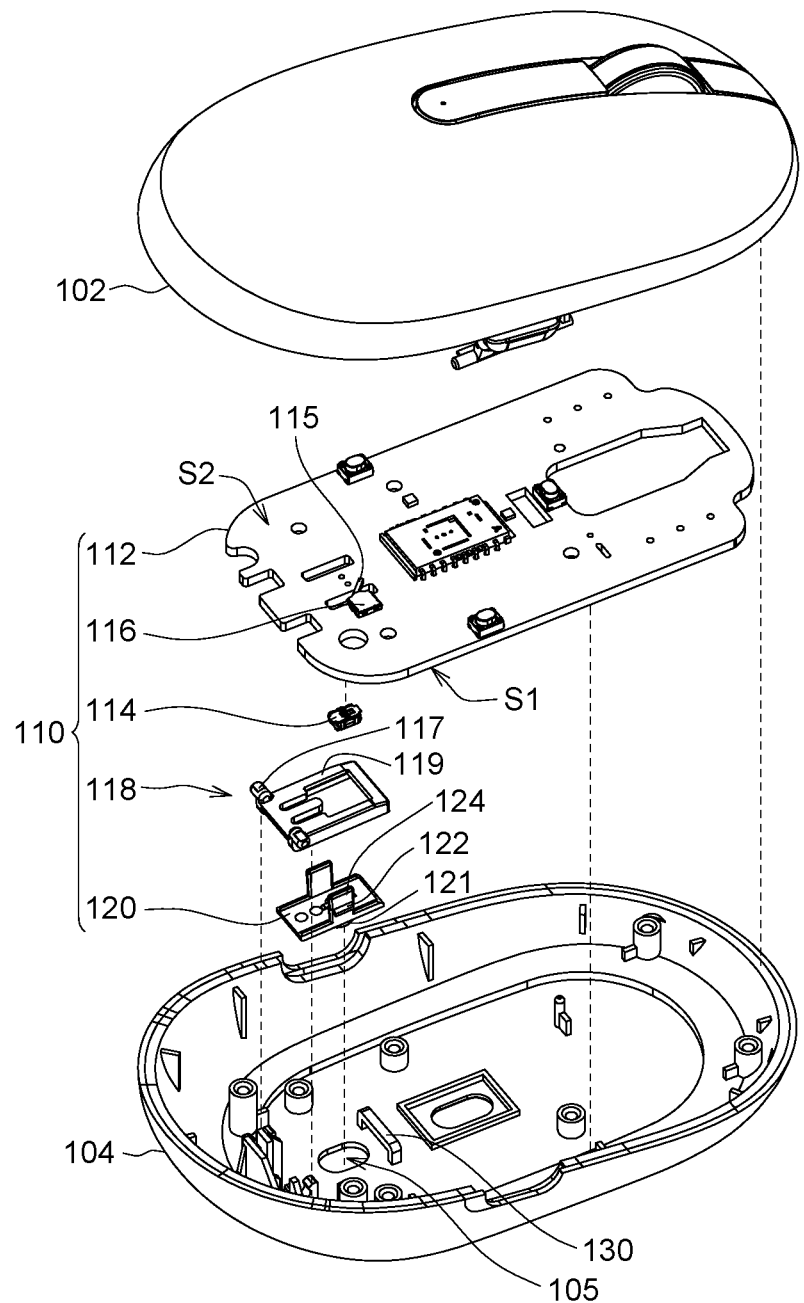
FIG. 1B is an explosion diagram of a wireless mouse according to an embodiment of the invention.

FIG. 1A is a schematic diagram of the bottom of a wireless mouse 100 according to an embodiment of the invention. FIG. 1B is an explosion diagram of a wireless mouse 100 according to an embodiment of the invention. As indicated in FIG. 1A and FIG. 1B, the wireless mouse 100 includes an upper cover 102, a lower cover 104 and a composite key structure 110. The upper cover 102 and the lower cover 104 are assembled as a casing for the user to grip at hand. The composite key structure 110 is interposed between the upper cover 102 and the lower cover 104 and is configured to turn on/off the power and perform Bluetooth pairing. Relevant operation principles of the wireless mouse 100 are generally known to anyone skilled in the art, and are not repeated here. Detailed structures of the composite key structure 110 are disclosed below.

Refer to FIG. 1A. The lower cover 104 is provided with an oval opening 105, and the composite key structure 110 has a button 121 exposed in the opening 105. When the button 121 is at a first position (i.e., at one end of the opening 105), the power is turned on, and the user can press the button 121 to perform Bluetooth pairing. When the button 121 is at a second position (i.e., at the other end of the opening 105), the power is turned off, and the user cannot press the button 121 to perform Bluetooth pairing.

Refer to FIG. 1B. The composite key structure 110 includes a circuit board 112, a first switch 114, a second switch 116, a first movable member 118 and a second movable member 120. The circuit board 112 has a first surface S1 and a second surface S2 opposite to the first surface S1. The first surface S1 is a bottom surface, and the second surface S2 is a top surface. The first surface S1 faces the lower cover 104 of the wireless mouse 100, and the second surface S2 faces the upper cover 102 of the wireless mouse 100. The first switch 114, such as a key switch, is disposed on the first surface S1. The second switch 116, such as a lever switch, is disposed on the second surface S2. However, the second switch 116 can also be a key switch, and the invention is not limited thereto.

In an embodiment, the first switch 114 is a Bluetooth pairing key, and the second switch 116 is a power switch for example. When the second switch 116 is in a power-on state and the user presses the button 121 to activate the first switch 114, the wireless mouse 100 can perform wireless setting, such as Bluetooth pairing. When the second switch 116 is in a power-off state, the wireless mouse 100 cannot perform wireless setting.

Figure 2A:
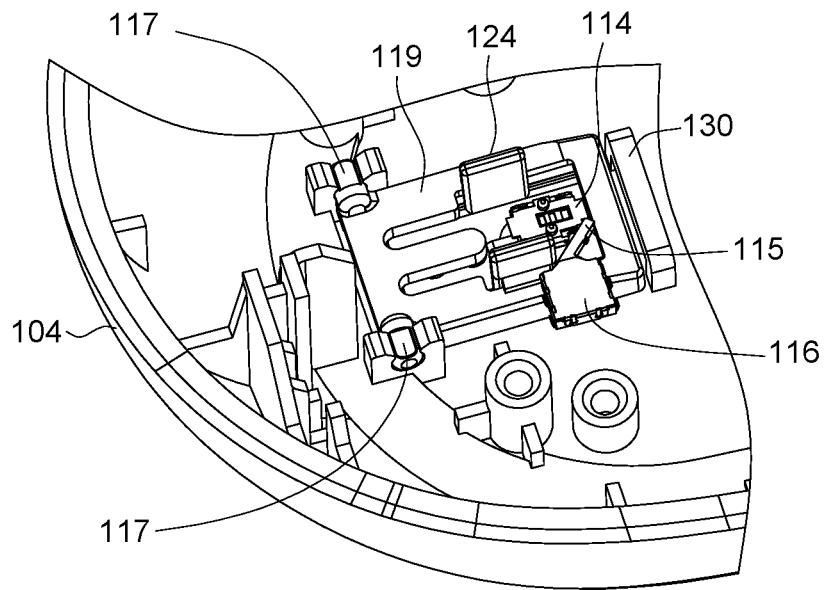
FIG. 2A and FIG. 2B respectively are actuation diagrams of the composite key structure of FIG. 1B.
Figure 2B:
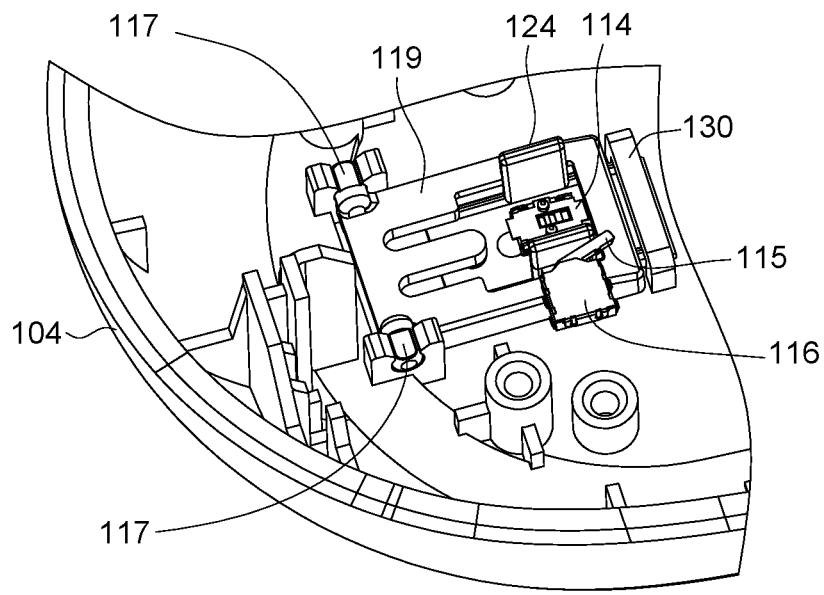

Refer to FIG. 1B, FIG. 2A and FIG. 2B. FIG. 2A and FIG. 2B respectively are actuation diagrams of the composite key structure 110 of FIG. 1B. As indicated in FIG. 2A, the second movable member 120 is at a first position. As indicated in FIG. 2B, the second movable member 120 is at a second position. For the elements to be more clearly illustrated, FIG. 2A and FIG. 2B illustrate the first switch 114 and the second switch 116 disposed on the circuit board 112 and no more illustrate the circuit board 112. In an embodiment, the first movable member 118 rotatably disposed on the first switch 114 relative to the circuit board 112. The first movable member 118 includes a shaft 117 and a supporting member 119. One end of the supporting member 119 fixedly connects the shaft 117, such that the supporting member 119 can rotate around the shaft 117. That is, when the user presses the button 121, the supporting member 119 can rotate relative to the shaft 117 to activate the first switch 114.

Besides, the second movable member 120 is slidably disposed on the first movable member 118. The second movable member 120 includes a sliding positioning member 122 and a paddle 124. One end of the paddle 124 connects the sliding positioning member 122, and the other end of the paddle 124 vertically passes through the supporting member 119. The paddle 124 horizontally slides relative to the supporting member 119 by the sliding positioning member 122, such that the second movable member 120 is limited and can only move between the first position and the second position relative to the first movable member 118.

As indicated in FIG. 2A, when the second movable member 120 is at the first position, the paddle 124 does not touch the second switch 116, and the second switch 116 is in a power-on state. In FIG. 2B, when the second movable member 120 moves to the second position from the first position, the paddle 124 of the second movable member 120 enables the second switch 116 to enter a power-off state.

Refer to FIG. 2B. The composite key structure 110 may further include a stopper 130 adjacent to the second position. That is, the stopper 130 is disposed at a position adjacent to the supporting member 119 but relatively farther away from one end of the shaft 117. When the second movable member 120 is at the second position, the second movable member 120 and the stopper 130 interfere with each other and limit the first movable member 118 to rotate relative to the circuit board 112. Even when the user presses the button 121, the supporting member 119 still cannot rotate relative to the shaft 117 to activate the first switch 114.

Refer to FIG. 2B. Suppose that the interference of the stopper 130 does not exist. Since the second switch 116 is already in a power-off state and the first switch 114 is not turned on, the first switch 114 still cannot be activated to perform wireless setting despite that the button 121 is pressed by the user.

Figure 3:
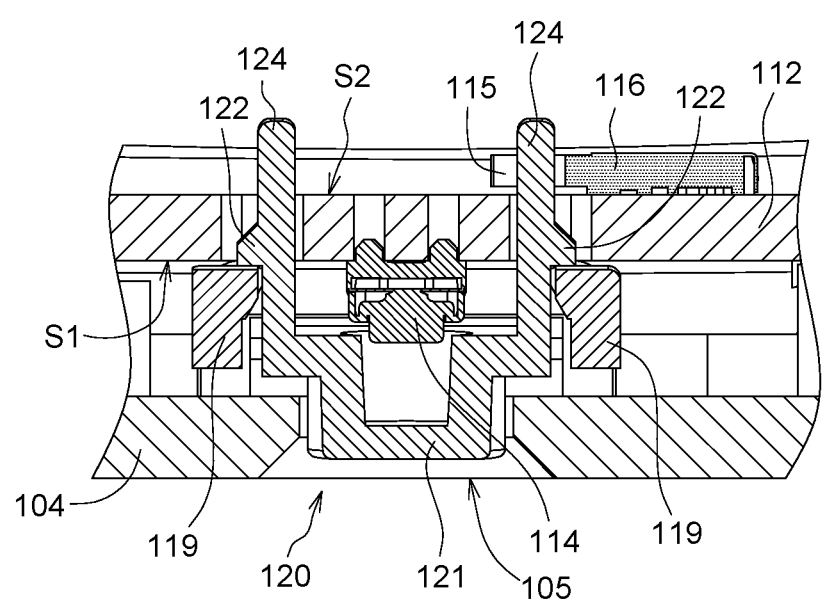
FIG. 3 is a cross-sectional view of the composite key structure of FIG. 2B.

Referring to FIG. 3, a cross-sectional view of the composite key structure 110 of FIG. 2B is shown. The second switch 116 is located on the second surface S2 of the circuit board 112, and the paddle 124 of the second movable member 120 vertically passes through the supporting member 119 and the circuit board 112 and is protruded above the circuit board 112. Therefore, the paddle 124 can contact and horizontally push the lever 115 of the second switch 116. As disclosed above, the composite key structure 110 can combine multiple keys as one single key, which only occupies a position on the lower cover 104 of a wireless mouse. Thus, the quantity of keys can be decreased.

Second Embodiment

Figure 4A:
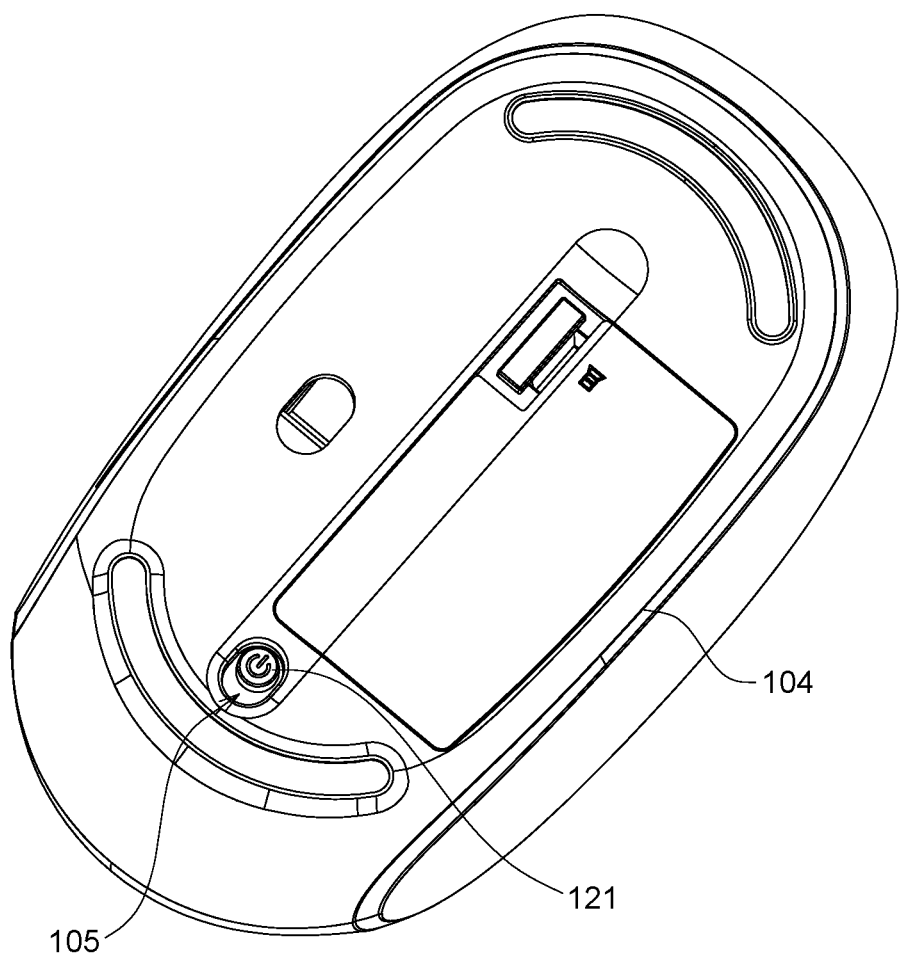
FIG. 4A is a schematic diagram of the bottom of a wireless mouse according to an embodiment of the invention.
Figure 4B:
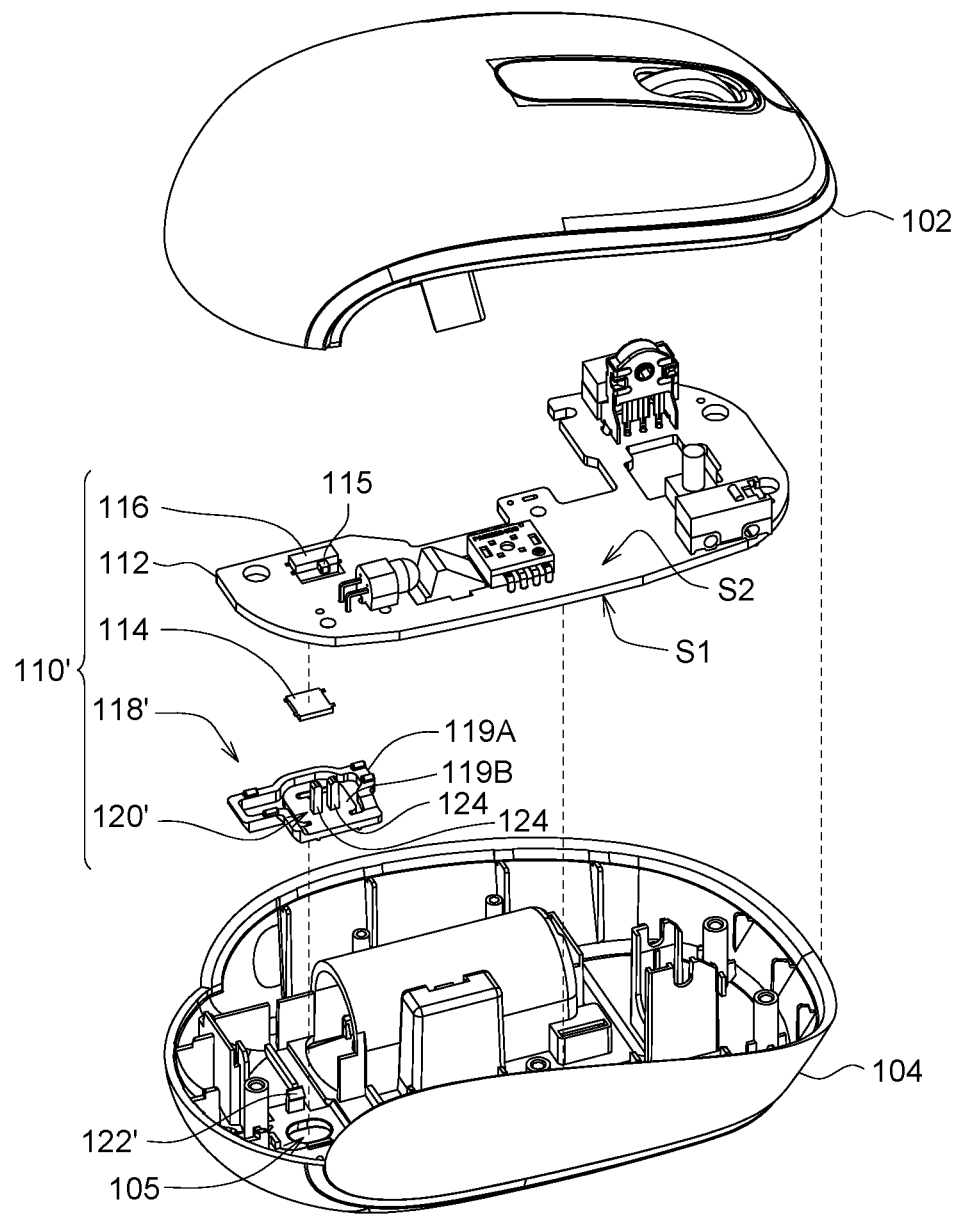
FIG. 4B is an explosion diagram of a wireless mouse according to an embodiment of the invention.

FIG. 4A is a schematic diagram of the bottom of a wireless mouse 101 according to an embodiment of the invention. FIG. 4B is an explosion diagram of a wireless mouse 101 according to an embodiment of the invention. As indicated in FIG. 4A and FIG. 4B, the wireless mouse 101 includes an upper cover 102, a lower cover 104 and a composite key structure 110'. The upper cover 102 and the lower cover 104 are assembled as a casing for the user to grip at hand. The composite key structure 110' is interposed between the upper cover 102 and the lower cover 104 and is configured to turn on/off the power and perform Bluetooth pairing. The composite key structure 110' of the present embodiment is similar to the composite key structure 110 of the first embodiment, and identical or similar elements are denoted by the same or similar designations.

As indicated in FIG. 4B, the composite key structure 110' includes a circuit board 112, a first switch 114, a second switch 116, a first movable member 118' and a second movable member 120'. The composite key structure 110' of the present embodiment is different from the composite key structure of above embodiments in that: the first movable member 118' can move and rotate relative to the circuit board 112, and the second movable member 120' is slidably disposed on the first movable member 118' and can move and rotate along with the first movable member 118'. In an embodiment, the first movable member 118' includes an outer frame 119A and a supporting member 119B. One end of the supporting member 119B connects the outer frame 119A. The supporting member 119B is located inside the outer frame 119A, and the supporting member 119B can rotate relative to the outer frame 119A. That is, when the user presses the button 121, the supporting member 119B can rotate to activate the first switch 114. Besides, the two paddles 124 of the second movable member 120' are vertically disposed on the supporting member 119B. As the first movable member 118' moves, the second movable member 120' can move to the second position from the first position to activate the second switch 116.

Figure 5A:
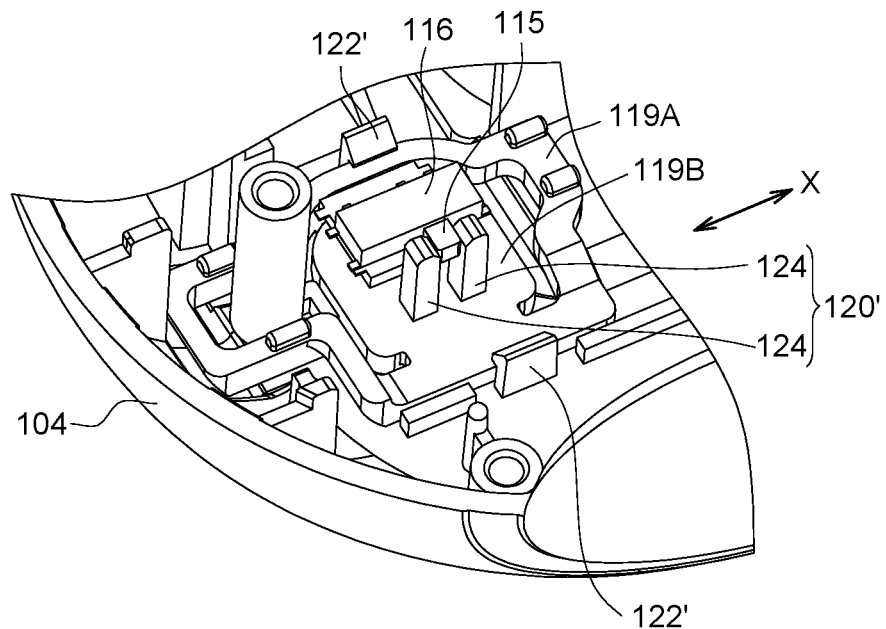
FIG. 5A and FIG. 5B respectively are actuation diagrams of the composite key structure of FIG. 4B.
Figure 5B:
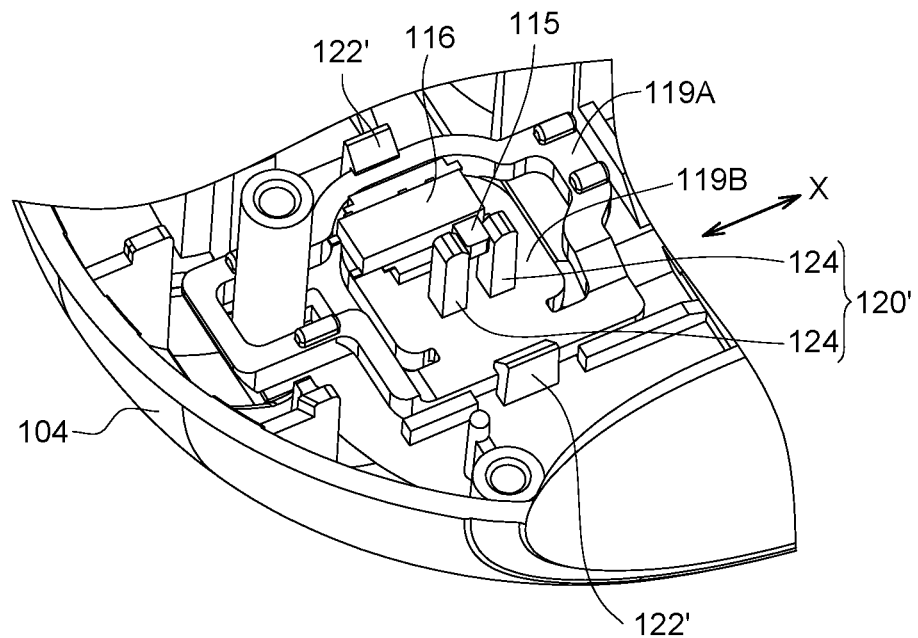

Refer to FIG. 4B, FIG. 5A and FIG. 5B. FIG. 5A and FIG. 5B respectively are actuation diagrams of the composite key structure 110' of FIG. 4B. As indicated in FIG. 5A, when the second movable member 120' is at the first position, the two paddles 124 of the second movable member 120' are located on the two sides of the second switch 116 without contacting the second switch 116, and the second switch 116 is in a power-on state. As indicated in FIG. 5B, when the second movable member 120' moves to the second position from the first position, the two paddles 124 of the second movable member 120' push the lever 115 of the second switch 116 and enable the second switch 116 to enter a power-off state.

Refer to FIG. 5A and FIG. 5B. In the present embodiment, the composite key structure 110' further includes two sliding positioning members 122' disposed on the lower cover 104. Being limited by the two sliding positioning members 122, the outer frame 119A of the first movable member 118' makes the first movable member 118' and the second movable member 120' only move between the first position and the second position along the direction of an axis X.

Figure 6:
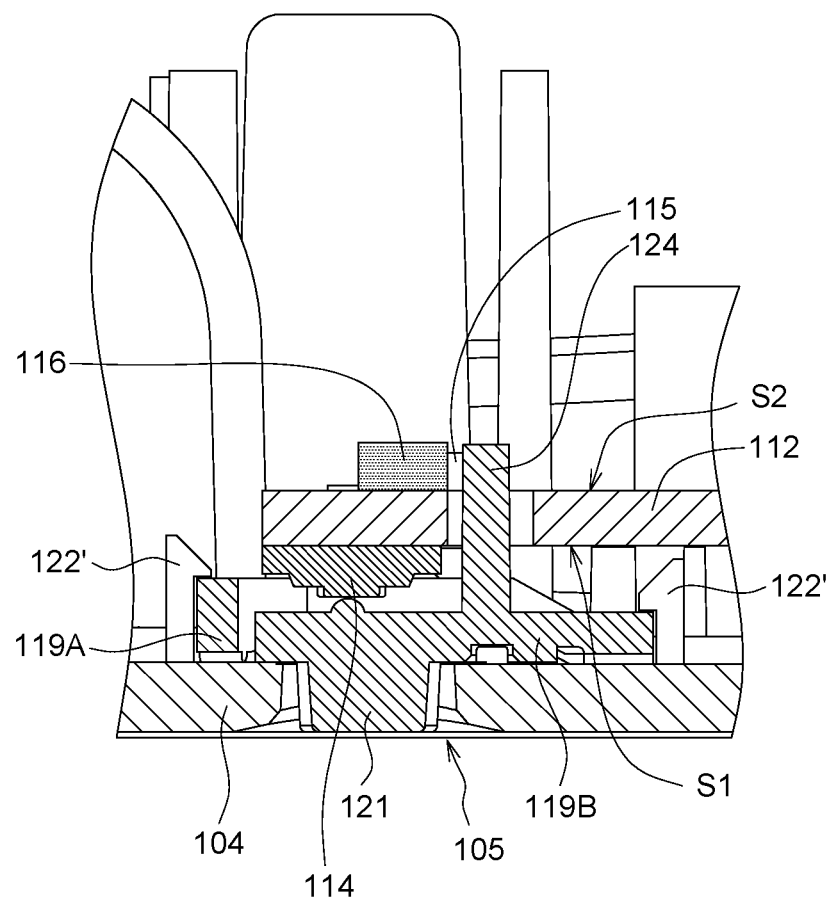
FIG. 6 is a cross-sectional view of the composite key structure of FIG. 5B.

Referring to FIG. 6, a cross-sectional view of the composite key structure 110' of FIG. 5B is shown. The second switch 116 is located on the second surface S2 of the circuit board 112, and the two paddles 124 of the second movable member 120' vertically pass through the circuit board 112 and are protruded above the circuit board 112. Therefore, the two paddles 124 can contact and horizontally push the lever 115 of the second switch 116 and enable the second switch 116 to enter a power-off state. Similarly, in FIG. 5B, suppose that the interference of the stopper does not exist (FIG. 2B). Since the second switch 116 is already in a power-off state and the first switch 114 is not turned on, the first switch 114 still cannot be activated to perform wireless setting despite that the button 121 is pressed by the user. As disclosed above, the composite key structure 110' combines multiple keys as one single key, which only occupies a position at the lower cover 104 of the mouse. Thus, the quantity of keys can be decreased.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A composite key structure, comprising:
   a circuit board having a first surface and a second surface opposite to the first surface;
   a first switch disposed on the first surface;
   a second switch disposed on the second surface;
   a first movable member movably and rotatably disposed on the first switch relative to the circuit board to activate the first switch; and
   a second movable member disposed on the first movable member and configured to move and rotate along with the first movable member to activate the second switch, wherein the first movable member comprises an outer frame and a supporting member, the outer frame is limited to move along an axial direction without rotation, one end of the supporting member is connected to the outer frame, the supporting member is at the outer frame and is pressed to rotate relative to the outer frame.

2. The composite key structure according to claim 1, wherein when the second movable member is at a first position, the first movable member rotates relative to the circuit board to activate the first switch, and the second switch is in a power-on state; when the second movable member move to a second position from the first position, the second movable member enables the second switch to enter a power-off state.

3. The key structure according to claim 1, wherein the second movable member comprises two paddles, one end of each paddle connects the supporting member and another end of each paddle vertically passes through the circuit board to contact the second switch.

4. The key structure according to claim 1, further comprising two sliding positioning members configured to limit the first movable member and the second movable member to move along an axial direction.

5. The composite key structure according to claim 1, wherein the first switch is a Bluetooth pairing key.

6. The composite key structure according to claim 1, wherein the second switch is a power switch.

7. A wireless electronic device, comprising:
   an upper cover;
   a lower cover assembled with the upper cover; and
   a composite key structure according to claim 1 interposed between the upper cover and the lower cover.

* * * * *